(12) United States Patent
Chang et al.

(10) Patent No.: US 8,804,990 B2
(45) Date of Patent: Aug. 12, 2014

(54) PORTABLE APPARATUS

(71) Applicant: Acer Incorporated, New Taipei (TW)

(72) Inventors: Jia-Ren Chang, New Taipei (TW);
Po-Jen Tu, New Taipei (TW);
Kuei-Ting Tai, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 13/802,664

(22) Filed: Mar. 13, 2013

(65) Prior Publication Data

US 2014/0098982 A1    Apr. 10, 2014

(30) Foreign Application Priority Data

Oct. 4, 2012 (TW) .............. 101136731 A

(51) Int. Cl.
*H04R 1/20* (2006.01)
(52) U.S. Cl.
USPC .......................... 381/345; 381/352
(58) Field of Classification Search
CPC ............................ H04R 2499/11; H04R 1/403
USPC ............ 381/345, 349, 388; 181/148; 379/430
See application file for complete search history.

(56) References Cited

U.S. PATENT DOCUMENTS

| | | | |
|---|---|---|---|
| 6,058,315 A | 5/2000 | Clark | |
| 6,064,894 A | 5/2000 | Zurek et al. | |
| 6,321,070 B1 | 11/2001 | Clark et al. | |
| 6,785,395 B1 | 8/2004 | Arneson et al. | |
| 8,108,144 B2 * | 1/2012 | Forstall et al. | 701/426 |
| 2001/0012371 A1 | 8/2001 | Baumhauer, Jr. et al. | |
| 2006/0113143 A1 * | 6/2006 | Ishida | 181/148 |
| 2008/0199038 A1 * | 8/2008 | Holmes et al. | 381/388 |
| 2009/0129623 A1 | 5/2009 | Weckstrom et al. | |
| 2009/0208048 A1 * | 8/2009 | Haas | 381/349 |
| 2009/0233651 A1 | 9/2009 | Weckstrom et al. | |
| 2010/0331058 A1 | 12/2010 | Qingshan et al. | |
| 2012/0128197 A1 * | 5/2012 | Li et al. | 381/395 |

FOREIGN PATENT DOCUMENTS

| | | |
|---|---|---|
| EP | 0753982 | 1/1997 |
| WO | 0021330 | 4/2000 |

* cited by examiner

*Primary Examiner* — Brian Ensey
*Assistant Examiner* — Norman Yu
(74) *Attorney, Agent, or Firm* — Jianq Chyun IP Office

(57) ABSTRACT

A portable apparatus including a main body and a receiver is provided. The main body has a surface, an active sound hole and a passive sound hole. The active sound hole and the passive sound hole are both disposed at the surface of the main body. The receiver is disposed inside the main body and arranged for emitting a first sound wave and a second sound wave with the same amplitude and frequency but opposite transmission directions. The first sound wave is transmitted out of the main body via the active sound hole and the second sound wave is guided in the main body and transmitted out of the main body via the passive sound hole.

12 Claims, 6 Drawing Sheets

PORTABLE APPARATUS

CROSS-REFERENCE TO RELATED APPLICATION

This application claims the priority benefit of Taiwan application serial no. 101136731, filed on Oct. 4, 2012. The entirety of the above-mentioned patent application is hereby incorporated by reference herein and made a part of this specification.

BACKGROUND

1. Field of the Disclosure

The disclosure generally relates to a portable apparatus, and more particularly, to a portable apparatus with good receiving effect.

2. Description of Related Art

Usually, a mobile device, such as a handheld portable wireless telephone, adopts a receiver to concert electrical signals into sound waves with a human audible frequency range. The receiver is often disposed at a relatively upper position of the portable apparatus to be close to the ear of user, so that the user can receive the converted sound wave with the human audible frequency range.

With the development of portable apparatus and the product design, the parts inside a portable apparatus are unlikely to get appropriate layout in a wished spacious space, instead, they are placed in crowd only, which makes the alignment of the earphone for transmitting sound wave with the receiver difficult.

In addition, the current receiver has only one sound outgoing hole, so the sound waves are transmitted out of the portable apparatus in a single sound source mode. Therefore, while the user is listening to the voice with the receiver, if the positions of the receiver and the ear are not aligned with the single sound source, the user has a lower acoustic sensitivity on the sound wave and easily gets unclear voice, even no voice is heard.

SUMMARY OF THE DISCLOSURE

Accordingly, the disclosure is directed to a portable apparatus, in which during the user is listening to the voice with the portable apparatus, an active sound hole and a passive sound hole disposed at the portable apparatus respectively emit out sound waves, so that the sound source spots received by the ear with the human audible sound-pressure range are increased and the receiving effect is advanced.

The disclosure provides a portable apparatus, which includes a main body and a receiver. The main body has a surface, an active sound hole and a passive sound hole. The active sound hole and the passive sound hole are both disposed at the surface of the main body. The receiver is disposed inside the main body and arranged for emitting a first sound wave and a second sound wave with the same amplitude and frequency but opposite transmission directions. The first sound wave is transmitted out of the main body via the active sound hole and the second sound wave is guided in the main body and transmitted out of the main body via the passive sound hole.

Based on the description above, in the portable apparatus of the disclosure, the active sound hole and the passive sound hole are both disposed on the same surface of the main body. Therefore, while the user is listening voice with the portable apparatus, the user can receive different sound waves emitted from the active sound hole and the passive sound hole located at different positions, which increases the sweet spots of human audible sound-pressure and advances the receiving effect.

In order to make the features and advantages of the present disclosure more comprehensible, the present disclosure is further described in detail in the following with reference to the embodiments and the accompanying drawings.

DESCRIPTION OF THE EMBODIMENTS

The disclosure provides a portable apparatus which has better receiving effect in comparison with the conventional portable apparatus. In the following, detailed description of the several preferred embodiments are given, in which the directional terminology, such as "front," "back," "left," "right," "top," "bottom," etc., is used with reference to the orientation of the figures being described. It should be noted the given embodiments and the relative positions between the components in the following are used for purposes of illustration and should not be regarded as limiting the disclosure.

[The First Embodiment]

Figure 1:
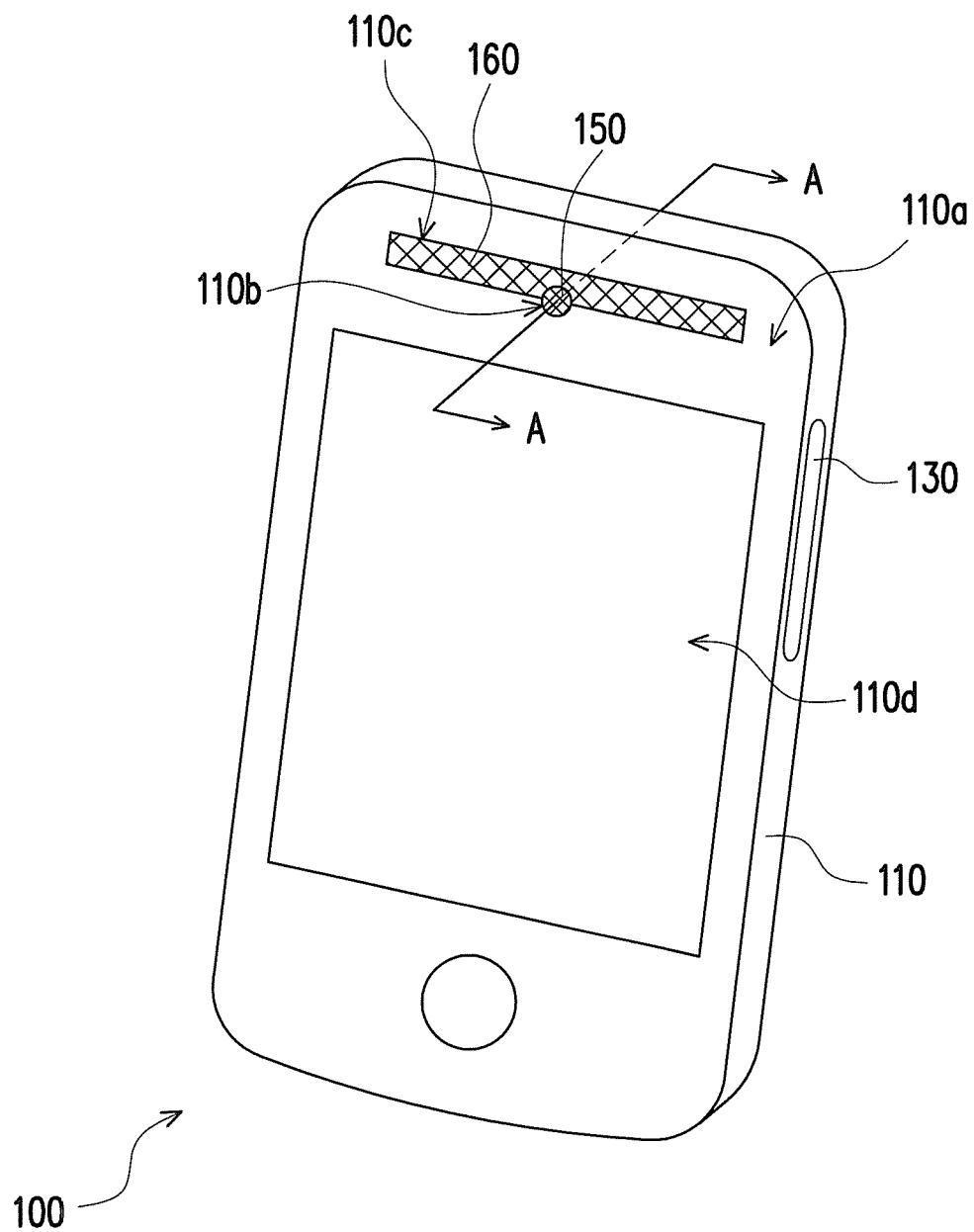
FIG. 1 is a schematic diagram of a portable apparatus according to the first embodiment of the disclosure.
Figure 2:
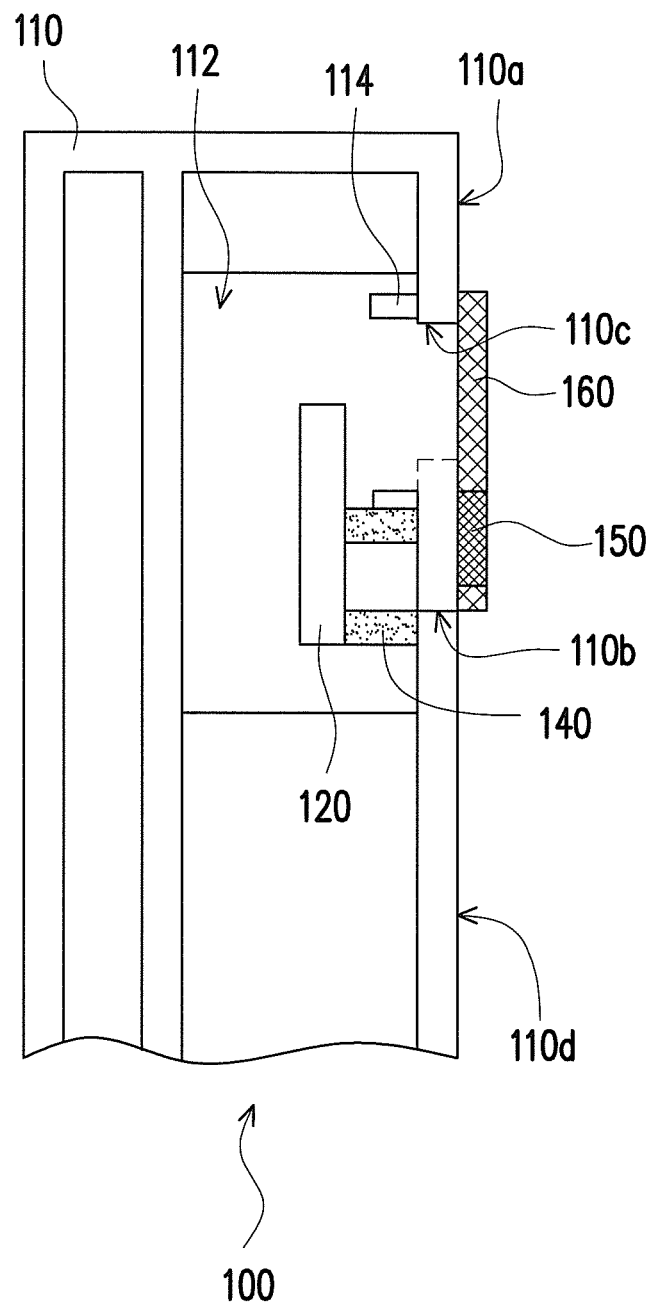
FIG. 2 is a cross-sectional diagram of FIG. 1 along line A-A.
Figure 3:
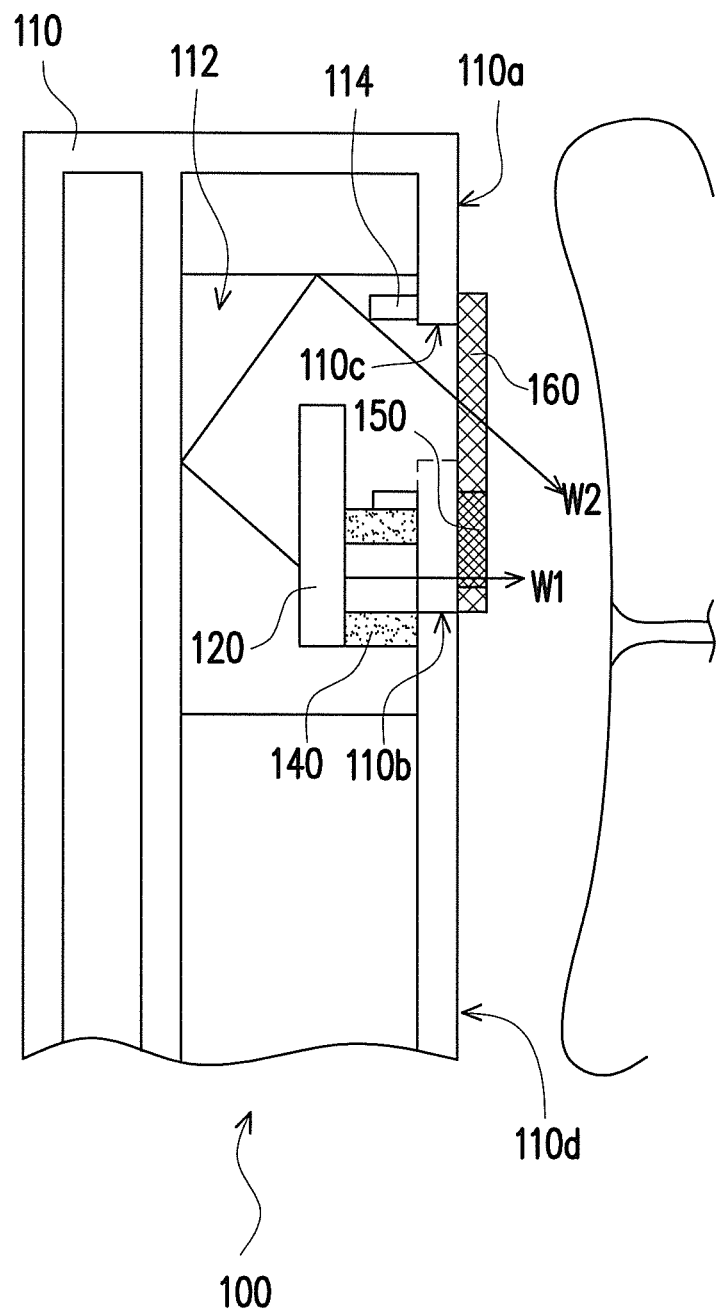
FIG. 3 is a diagram showing the transmissions of the first sound wave and the second sound wave when the ear of a user is close to the portable apparatus.

FIG. 1 is a schematic diagram of a portable apparatus 100 according to the first embodiment of the disclosure and FIG. 2 is a cross-sectional diagram of FIG. 1 along line A-A. Referring to FIGS. 1 and 2, the portable apparatus 100 includes a main body 110 and a receiver 120, in which the main body 110 has a surface 110a, an active sound hole 110b and a passive sound hole 110c. The active sound hole 110b and the passive sound hole 110c are both disposed at the surface 110a of the main body 110. The receiver 120 is disposed inside the main body 110 and arranged for emitting a first sound wave W1 and a second sound wave W2 with the same amplitude and frequency but opposite transmission directions (as shown by FIG. 3). It should be noted that the first sound wave W1 is transmitted out of the main body 110 via the active sound hole 110b and the second sound wave W2 is guided in the main body 110 and then transmitted out of the main body 110 via the passive sound hole 110c.

In the embodiment, at least a part of the active sound hole 110b and a part of the passive sound hole 110c are overlapped with each other, but the active sound hole 110b and the passive sound hole 110c are isolated. In other words, the active sound hole 110b and the passive sound hole 110c are not entirely overlapped with each other. The effective radiating area of the active sound hole 110b is smaller and the effective radiating area of the active sound hole 110b ranges between 1 $mm^2$ and 4 $mm^2$; the effective radiating area of the passive sound hole 110c is larger than the active sound hole 110b and the effective radiating area of the passive sound hole 110c ranges between 10 $mm^2$ and 20 $mm^2$. The ratio of the effective radiating area of the active sound hole 110b over the effective radiating area of the passive sound hole 110c is less than or equal to 1:3. In addition, the shapes of the active sound hole 110b and the passive sound hole 110c are not limited, which can be rectangle, square, circle, ellipse or a combination thereof depending on the industry design requirement.

The main body 110 further has a sound-guiding chamber 112 surrounding at least one side of the receiver 120 and connected with the passive sound hole 110c. In more details, the sound-guiding chamber 112 is formed on one of structure parts composing of the main body 110. The sound-guiding chamber 112 can be a chamber or a channel depending on the design requirement. One end of the sound-guiding chamber 112 is connected to the receiver 120 for receiving the second sound wave W2; another end of the sound-guiding chamber 112 is connected to the passive sound hole 110c so that the second sound wave W2 in the sound-guiding chamber 112 is transmitted out of the passive sound hole 110c.

In addition, the main body 110 further has a pair of sound-guiding pipes 114 disposed in the sound-guiding chamber 112 and located at both sides of the passive sound hole 110c. By disposing the sound-guiding pipes 114, the phase of the second sound wave W2 gets inverted to advance and extend the low-frequency response of the second sound wave W2.

In the portable apparatus 100 of the embodiment, the surface 110a and a user input interface (not shown) are integrally formed. The surface 110a has a displaying region 110d and the active sound hole 110b and the passive sound hole 110c are located on top of the displaying region 110d. The so-called integrally formation of the surface 110a and the user input interface means the surface 110a is also a part of the user input interface, and the user enters instructions such as executing program, calling, typing or moving frames, and so on through touching the displaying region 110d of the surface 110a.

In addition, in order to make the user conveniently adjust the receiving volume during calling, the portable apparatus 100 further includes a volume adjusting button 130 disposed at one side of the main body 110. By disposing the volume adjusting button 130 at one side of the main body 110, the user during receiving a call can use finger to press the volume adjusting button 130 (as shown by FIG. 1) for controlling the heard volume.

Since the first sound wave W1 has a front sound wave and a back sound wave during the transmitting thereof, the front sound waves and the back sound waves are interrupted by each other to form dipole sound waves, which produces an effect to make the sounds counteracted by each other. In order to avoid the phenomena, the portable apparatus 100 further includes a buffering washer 140 disposed between the receiver 120 and the active sound hole 110b (as shown by FIG. 2). The buffering washer 140 seals the surrounding portion of the receiver 120 to foil n monopole sound mode for preventing the sounds from being counteracted by each other.

Continuing to FIGS. 1 and 2, the portable apparatus 100 further includes a first dust-proof mesh 150 disposed at the main body 110 and covering the active sound hole 110b. In the same way, a second dust-proof mesh 160 can be disposed to cover the passive sound hole 110c. Dust is prevented from entering the main body 110 via the active sound hole 110b or the passive sound hole 110c to affect the operation of the electronic components (not shown) in the main body 110 by disposing the first dust-proof mesh 150 and the second dust-proof mesh 160.

FIG. 3 is a diagram showing the transmissions of the first sound wave W1 and the second sound wave W2 when the ear of a user is close to the portable apparatus. Referring to FIGS. 1, 2 and 3, when the user receives calling with the portable apparatus 100, the receiver 120 emits the first sound wave W1 and the second sound wave W2 with the same amplitude and frequency but opposite transmission directions, in which the first sound wave W1 directly travels forwards to be transmitted out of the main body 110 via the active sound hole 110b, followed by entering the ear of the user. The second sound wave W2 however travels backwards to enter the sound-guiding chamber 112, and then, through the guiding of the sound-guiding chamber 112, is transmitted out of the main body 110 via the passive sound hole 110c. The guiding of the sound-guiding chamber 112 for the second sound wave W2 herein means when the second sound wave W2 travels and arrives at the wall of the sound-guiding chamber 112, the second sound wave W2 is reflected to change the transmission direction thereof. In more details, the phase of the second sound wave W2 emitted at the back of the receiver 120 is inverted and then the second sound wave W2 is transmitted out of the main body 110 via the passive sound hole 110c. At the time, the first sound wave W1 emitted at the front of the receiver 120 and the second sound wave W2 emitted at the back of the receiver 120 are not counteracted, instead, are enhanced by each other.

When the first sound wave W1 is transmitted out of the main body from the active sound hole 110b and is received by the ear of the user, the second sound wave W2 transmitted out of the main body 110 from the passive sound hole 110c is also received by the ear of the user, in which when both the first sound wave W1 from the active sound hole 110b and the second sound wave W2 transmitted out of the main body 110 from the passive sound hole 110c reach the ear, the first sound wave W1 and the second sound wave W2 are separated by a distance without overlapping, therefore, in terms of the user, there are two sweet spots of human audible sound-pressure caused by the sound waves.

In comparison with the conventional portable apparatus where only one sound source hole is disposed corresponding to using only a forward transmitted sound wave, so that when the ear is receiving the sound wave, there is one single sound source only for audible feeling. For the portable apparatus 100 in the embodiment, there are increased sweet spots of human audible sound-pressure to reach the ear of the user due to both the active sound hole 110b and the passive sound hole 110c emit sound waves. As a result, when the portable apparatus 100 in the embodiment has the volume same as the volume of the conventional portable apparatus, the portable apparatus 100 of the embodiment can have more clear audible effect.

In addition, since the first sound wave W1 and the second sound wave W2 are separated by a distance, if the hand posture for the user to hold the portable apparatus 100 is inclined to make one of the sound holes (the active sound hole 110b or the passive sound hole 110c) is apart from the ear, the sound wave transmitted out of the main body 110 from the other hole (the passive sound hole 110c or the active sound hole 110b) can still keep the user hearing a clear voice.

[The Second Embodiment]

The embodiment is similar to the first embodiment and the same or similar notations in the embodiment represent the same or similar components. The difference between the two embodiments is depicted in following.

Figure 4:
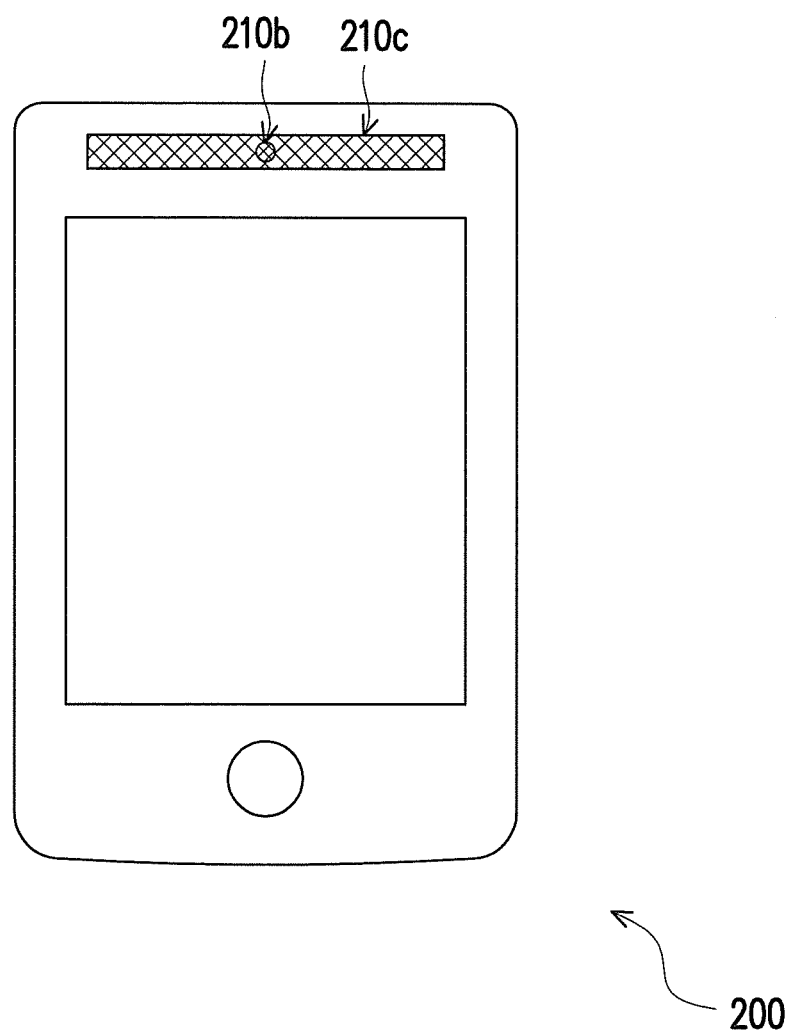
FIG. 4 is a schematic diagram of a portable apparatus according to the second embodiment of the disclosure.

FIG. 4 is a schematic diagram of a portable apparatus 200 according to the second embodiment of the disclosure. Referring to FIG. 4, the difference in the embodiment from the first embodiment rests in that the active sound hole 210b and the passive sound hole 210c of the portable apparatus 200 are entirely overlapped with each other, in which the effective radiating area of the active sound hole 210b is smaller and the effective radiating area of the passive sound hole 210c is larger, therefore, the active sound hole 210b is located in the passive sound hole 210c by design.

[The Third Embodiment]

The embodiment is similar to the first embodiment and the same or similar notations in the embodiment represent the same or similar components. The difference between the two embodiments is depicted in following.

Figure 5:
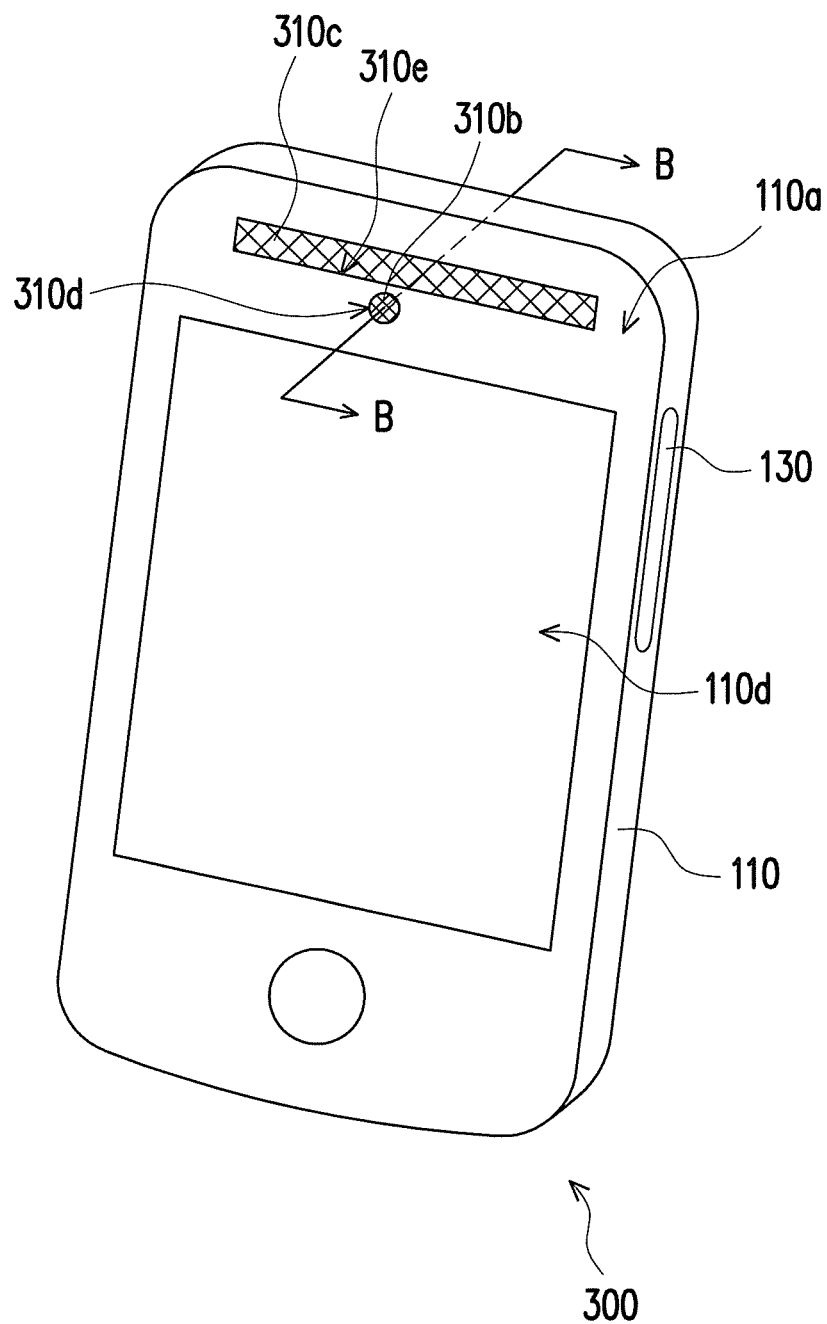
FIG. 5 is a schematic diagram of a portable apparatus according to the third embodiment of the disclosure.

FIG. 5 is a schematic diagram of a portable apparatus 300 according to the third embodiment of the disclosure. Referring to FIG. 5, the difference in the embodiment from the first embodiment rests in that the active sound hole 310b and the passive sound hole 310c of the portable apparatus 300 are totally isolated with each other. In other words, the active sound hole 310b and the passive sound hole 310c of the portable apparatus 300 are totally not overlapped with each other. In more details, the active sound hole 310b has a first edge 310d, the passive sound hole 310c has a second edge 310e, and the first edge 310d is adjacent to the second edge 310e but separated by a distance.

Figure 6:
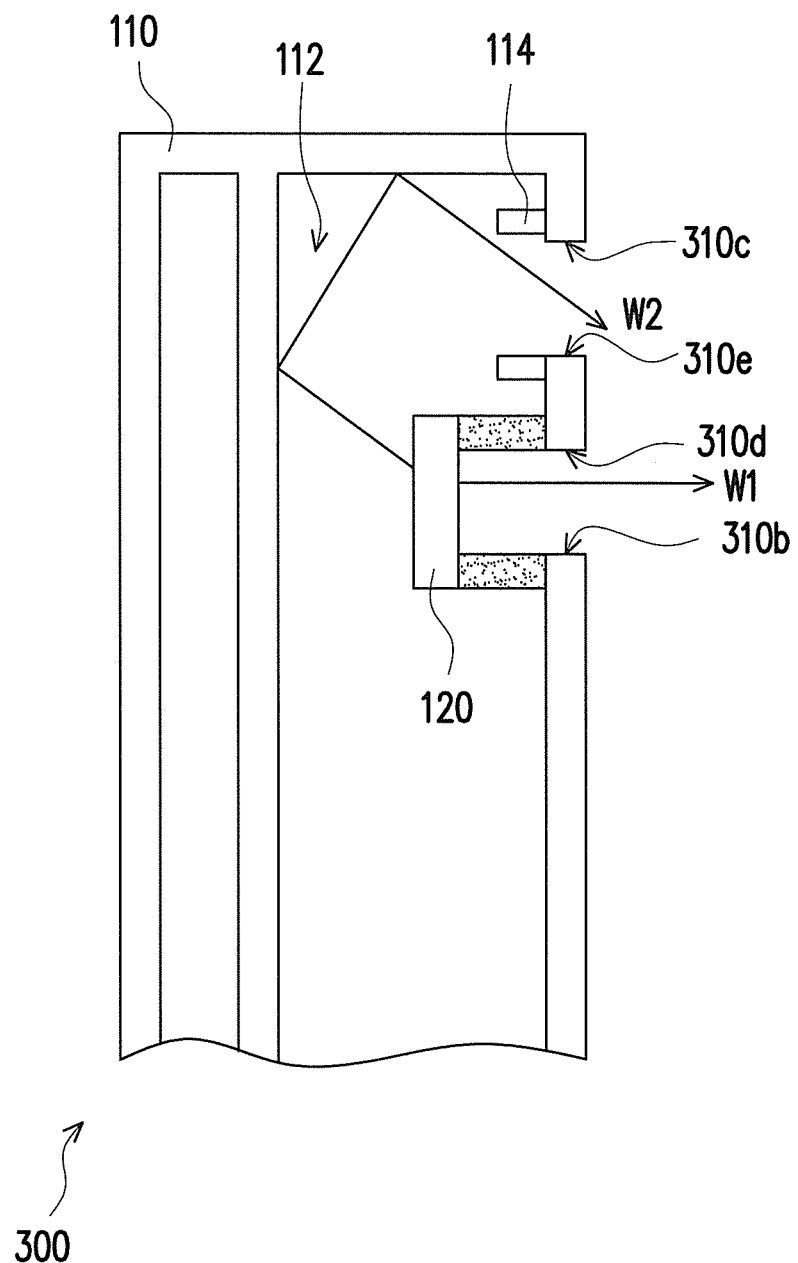
FIG. 6 is a cross-sectional diagram of FIG. 5 along line B-B.

FIG. 6 is a cross-sectional diagram of FIG. 5 along line B-B. Referring to FIGS. 5 and 6, by means of the above-mentioned design that the active sound hole 310b and the passive sound hole 310c of the portable apparatus 300 are totally not overlapped with each other, the distance between the sweet spots of human audible sound-pressure for the ear to receive the voice is increased and the possible ranges for the first sound wave W1 and the second sound wave W2 to enter the ear are increased. As a result, even the hand posture for the user to hold the portable apparatus 300 is inclined to make one of the sound holes more away from the ear, the sound wave transmitted out of the main body 110 from the other hole can still keep the user hearing a clear voice and the receiving effect is advanced.

In summary, in the portable apparatus of the disclosure, the active sound hole and the passive sound hole are both disposed on the same surface of the main body, so that the sound wave originally transmitted towards the back side of the main body after emitting from the receiver is guided, and then, is transmitted out from the front side of the portable apparatus. As a result, during receiving call with the portable apparatus of the disclosure by a user, the user would receive the sound waves come from the active sound hole and the passive sound hole with different locations, the sweet spots of human audible sound-pressure are accordingly increased to enhance the receiving effect.

In addition, while the user is listening call with the portable apparatus, even the ear is apart from one of the two sound holes by a longer distance but the ear can be closer to the other sound hole, so that the user still can hear clear voice.

It will be apparent to those skilled in the art that the descriptions above are several preferred embodiments of the disclosure only, which does not limit the implementing range of the disclosure. Various modifications and variations can be made to the structure of the disclosure without departing from the scope or spirit of the disclosure. The claim scope of the disclosure is defined by the claims hereinafter.

What is claimed is:

1. A portable apparatus, comprising:
   a main body, having a surface;
   an active sound hole;
   a passive sound hole, wherein the active sound hole and the passive sound hole are both disposed at the surface of the main body, wherein the active sound hole and the passive sound hole are at least partially overlapped with each other; and
   a receiver, disposed inside the main body, arranged for emitting a first sound wave and a second sound wave, wherein amplitudes and frequencies of the first sound wave and the second sound wave are the same as each other but transmission directions thereof are opposite to each other, the first sound wave is transmitted out of the main body via the active sound hole, and the second sound wave is guided in the main body and transmitted out of the main body via the passive sound hole.

2. The portable apparatus as claimed in claim 1, wherein the active sound hole and the passive sound hole are totally isolated with each other, the active sound hole has a first edge, the passive sound hole has a second edge, and the first edge and the second edge are adjacent to each other but separated by a distance.

3. The portable apparatus as claimed in claim 1, wherein an effective radiating area of the active sound hole ranges between 1 mm$^2$ and 4 mm$^2$.

4. The portable apparatus as claimed in claim 1, wherein an effective radiating area of the passive sound hole ranges between 10 mm$^2$ and 20 mm$^2$.

5. The portable apparatus as claimed in claim 1, wherein the ratio of an effective radiating area of the active sound hole over an effective radiating area of the passive sound hole is less than or equal to 1:3.

6. The portable apparatus as claimed in claim 1, wherein the main body further comprises:
   a sound-guiding chamber, surrounding at least one side of the receiver and connected with the passive sound hole.

7. The portable apparatus as claimed in claim 6, wherein the main body further comprises:
   a pair of sound-guiding pipes, disposed in the sound-guiding chamber of the main body and located at both sides of the passive sound hole.

8. The portable apparatus as claimed in claim 1, wherein the surface has a displaying region, and the active sound hole and the passive sound hole are located on top of the displaying region.

9. The portable apparatus as claimed in claim 1, further comprising:
   a first dust-proof mesh, disposed at the main body and covering the active sound hole.

10. The portable apparatus as claimed in claim 1, further comprising:
    a second dust-proof mesh, disposed at the main body and covering the passive sound hole.

11. The portable apparatus as claimed in claim 1, further comprising:
    a volume adjusting button, disposed at one side of the main body.

12. The portable apparatus as claimed in claim 1, further comprising:
    a buffering washer, disposed between the receiver and the active sound hole, wherein the buffering washer seals the surrounding portion of the receiver to form monopole sound mode for preventing the sounds from being counteracted by each other.

\* \* \* \* \*